United States Patent

[11] 3,625,540

[72] Inventor David E. Jewell
    Littleton, Colo.
[21] Appl. No. 48,347
[22] Filed June 22, 1970
[45] Patented Dec. 7, 1971
[73] Assignee The Gates Rubber Company
    Denver, Colo.

[54] HYDRAULIC SUSPENSION UNIT
    3 Claims, 2 Drawing Figs.

[52] U.S. Cl. .................................................. 280/124 F,
                                                          267/65 R
[51] Int. Cl. .................................................. B60g 11/58
[50] Field of Search .................................. 280/124 F;
                                                          267/34, 65

[56] References Cited
    UNITED STATES PATENTS
    2,905,458 9/1959 Mason ........................ 267/34 X
    FOREIGN PATENTS
    958,083 2/1957 Germany ..................... 267/34

Primary Examiner—Philip Goodman
Attorneys—H. W. Oberg, Jr., Raymond Fink and Curtis H. Castleman ABSTRACT: A load-leveling hydraulic suspension unit of low spring rate having a hydraulic circuit that includes a fluid reservoir, a self-contained pumping system, a high-pressure chamber, a spring-biased pressure-regulating chamber, and interconnecting fluid passageways with flow-regulating valves and seals. A hydraulic suspension unit which provides load-leveling forces at a low spring rate.

PATENTED DEC 7 1971 3,625,540

INVENTOR.
DAVID E. JEWELL
BY H. H. Oberg Jr.
ATTORNEY

HYDRAULIC SUSPENSION UNIT

BACKGROUND OF THE INVENTION

This invention relates to coil and fluid pressure suspension devices for vehicles but more particularly, the invention relates to a load-leveling hydraulic suspension unit of low spring rate.

Problems involved with prior art load-leveling suspension units of the coil and fluid type include fitting the device within a tolerable space envelope while retaining a low spring rate and high load-leveling capability. Typically, the extensible or telescopic member of prior art devices is mechanically in series with a coil spring. The coil spring has a high rate for load-leveling purposes. Consequently, the spring rate of the device is directly affected by the rate of coil spring.

SUMMARY OF THE INVENTION

The load-leveling suspension unit herein described has three chambers through which flow of a working fluid is precisely controlled by interconnecting passageways, seals, valving means, and pumping means. Working fluid under pressure is transferred by the pumping means from a fluid reservoir chamber to a high-pressure chamber. A telescopic member with a hydraulic reacting surface area defined thereof extends from and reciprocates in the high-pressure chamber. Fluid pressure in the high-pressure chamber reacts against the cross section surface area to extend the telescopic member to a predetermined position. A pressure-regulating chamber, hydraulically communicable with the high-pressure chamber is biased to a smaller volume by a spring-loaded piston. The area of the piston is greater than the area defined by the telescopic member. Consequently, the spring force exerted on the piston is indirectly transferred hydraulically to the telescopic member and is reduced in amount as a function of the ratio of the two areas.

Accordingly, it is an object of the invention to provide a suspension unit of low spring rate.

Another object of the invention is to provide a suspension unit that will fit within a tolerable space envelope of an automotive vehicle.

Still another object of the invention is to provide a coil and fluid device where the spring rate of the coil does not directly add to the spring rate of the device.

Yet another object of the invention is to provide a fluid circuit where the mechanical spring rate of the coil is hydraulically reduced.

These and other objects and advantages of the invention will become more apparent upon review of the drawings and description thereof wherein.

DESCRIPTION OF PREFERRED EMBODIMENT

Figure 1:
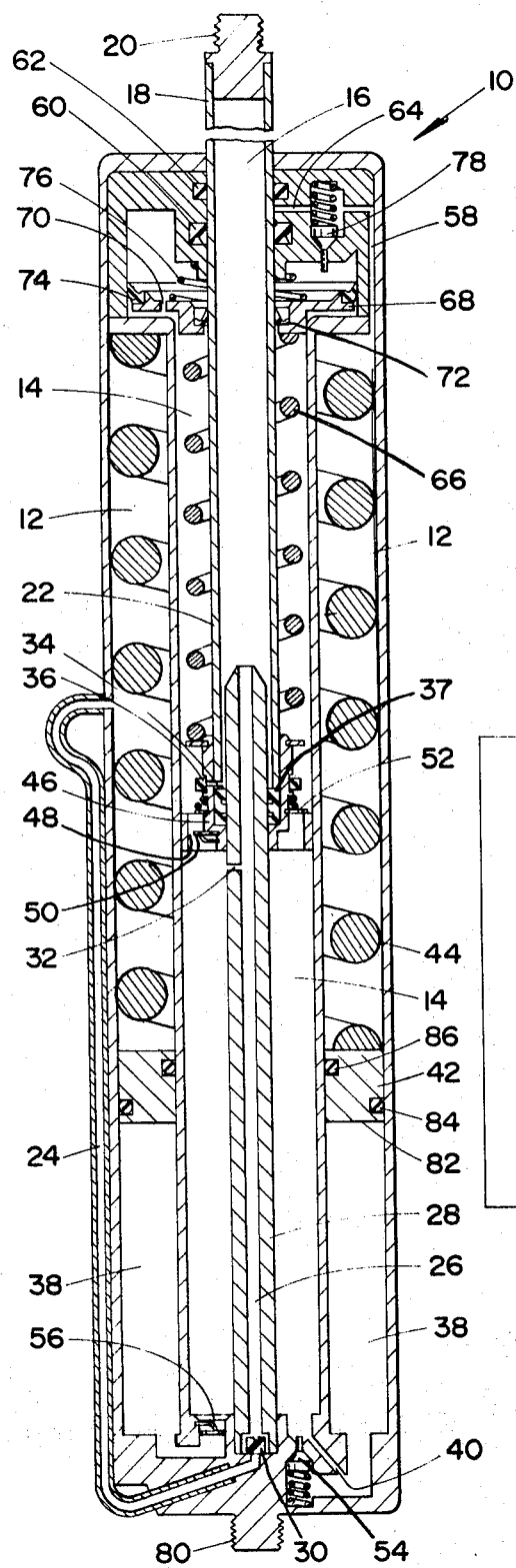
FIG. 1 is an axial cross-sectional view of a preferred embodiment of the invention.

Referring to FIG. 1, the load-leveling suspension unit 10 has a fluid reservoir 12 from which a working fluid is transferred to a high-pressure chamber 14 by means of a reciprocating pump that includes a cylinder and piston. The pump cylinder 16 is formed by a telescopic member 18 of which one end forms a mounting attachment 20 and the other end 22 of which is reciprocable in the high-pressure chamber 14. Working fluid flows from the fluid reservoir 12 through passageway 24 and into the internal bore 26 of the pump piston 28. Check valve 30 allows only unidirectional fluid flow from the reservoir 12. Fluid flow from the pump cylinder 16 may enter the high-pressure chamber through the radial opening 32 or through passageway 34. Check valve 36 allows unidirectional fluid flow from the pump cylinder 16 to the high-pressure chamber 14. Seal 37 and radial opening 32 coact to form a pressure-equalizing valve whose functioning is regulated by the relative location of the pump cylinder 16 with respect to the pump piston 28. The high-pressure chamber is hydraulically communicable with a pressure-regulating chamber 38 through an orifice 40. Fluid pressure in the regulating chamber 38 is balanced against an annular piston 42. A high-rate spring 44 disposed within the fluid reservoir 12 exerts force against the piston 42 to bias the regulating chamber 38 to a smaller volume. Fluid movement associated with the high-pressure chamber is controlled by a plurality of seals, valves and orifices.

A damping piston 46 disposed within the high-pressure chamber 14, is attached to and is reciprocable with the telescopic member 18. During extension of the telescopic member 18, rebound damping forces are generated across the damping piston 46 by the rebound orifice 48 and combination check valve 50. Damping is controlled by the rebound orifice 48 at normal extension velocities. Should extension velocities become excessive, check valve 50 opens to permit a second stage of damping across the piston 46. A jounce replenishing valve 52 opens during retraction of the telescopic member 18 to bypass the rebound orifice 48 and permit unrestricted movement of the damping piston 46.

Jounce damping forces are generated across the jounce orifice 40 and check valve 54 during retraction of the telescopic member 18. Damping is controlled by the jounce orifice. Should retraction velocities become excessive, check valve 54 opens to permit a second stage of jounce damping. A rebound replenishing valve 56 opens during extension of the telescopic member to bypass the jounce orifice 40 to permit unrestricted flow of fluid from the pressure-regulating chamber to the high-pressure chamber 14.

Fluid is returned from the high-pressure chamber 14 to the fluid reservoir 12 through a passageway 58. A high-pressure seal 60 minimizes fluid leakage from the high-pressure chamber whereas a low-pressure seal 62 minimizes external fluid leakage. Any leakage past the high-pressure seal 62 is channeled to the reservoir through passageway 64. Should the telescopic member be hydraulically displaced to an extended position for an excessive period of time, fluid is returned to the fluid reservoir under the control of a time delay device. The device includes a spring 66, a floating piston 68 having an orifice 70 therein, lip seals 72, 74, a return spring 76 and a relief valve 78. Operation of the time delay device is best understood in conjunction with the suspension unit 10 while in use.

When the suspension unit is in use, mounting attachment 20 is secured to a sprung automotive mass whereas mounting attachment 80 is secured to an unsprung automotive mass. If the suspension system is loaded, telescopic member 18 is retracted which causes radial opening 32 to be sealed from the high-pressure chamber by seal 37. Reciprocatory motion between the mounting attachments 20, 80 causes the pump piston 28 to move in relation to the pump cylinder 16. As the pump piston 28 is retracted from the pump cylinder 16, pressure in the cylinder 16 is reduced below atmospheric which induces the check valve 30 to open and permit fluid flow from the reservoir 12 through the internal bore 26, and to the pump cylinder. When reciprocatory motion reverses, the piston 28 enters the cylinder 16 causing fluid pressure therein to rise above the pressure in the high-pressure chamber 38. Check valve 30 closes and fluid is pumped between the clearance of the pump piston 28 and cylinder 16, through the opening 34 and check valve 36, and to the high-pressure chamber 38. As reciprocatory motion continues, fluid pressure rises in the high-pressure chamber 38. The fluid, under pressure, reacts against the cross-sectional surface area of the telescopic member 18 and causes it to extend from the suspension unit 10. Simultaneously, fluid pressure rises in the pressure-regulating chamber 38 and reacts against the surface 82 of the annular piston 42. The high-rate spring 44 is compressed as fluid pressure increases causing displacement of the annular piston 42. Annular seals 84, 86 minimize fluid leakage from the pressure-regulating chamber back to the fluid reservoir 12. Fluid pumping ceases when telescopic member 18 reaches a predetermined position where seal 37 slides past radial opening 32. Radial opening 32 allows direct hydraulic communication between the pump cylinder 16 and the high-pressure chamber 38.

It is readily understood that fluid pressure is the same in the pump cylinder 16, high-pressure chamber 14 and pressure-regulating chamber 38 after the telescopic member attains the predetermined position and when there is no relative movement between the mounting attachments 20, 80. Fluid pressure is statically balanced against the spring 44 through the annular piston 42. When telescopic member 18 is retracted into the high-pressure chamber, fluid is transferred in an amount equal to the volume displaced by the member 18 as it enters the chamber 14. Fluid is transferred to the pressure-regulating chamber 38 where it hydraulically reacts against the annular surface 82. This causes a compression of the spring 44. The spring 44 exerts a force on the piston 42 in accordance with its rate which may be either lineal or variable. The rate of the spring 44 is high in comparison to the rate indirectly transferred hydraulically to the telescopic member as illustrated by the following example.

EXAMPLE

Assuming the cross-sectional area of the telescopic member is 0.3 square inch and the area 82 of the annular piston is 3.0 square inches, relative movement between the telescopic member 18 and piston 42 is in the ratio of 3.0:0.3 or 10:1. Accordingly, if the telescopic member is retracted 1.0 inch, the annular piston 42 moves 0.1 inch and compresses the spring 0.1 inch. For a spring 44 having a rate of 1,500 pounds per inch, a force of 0.1 (1,500) or 150 pounds will be exerted on the annular piston 42. The 150-pound force is distributed across the 3.0-inch surface 82 which increases fluid pressure in the pressure-regulating chamber 38 and high-pressure chamber 14 to 3.0(150) or 50 pounds per square inch. The increase in pressure results in a force transferred to the telescopic member of 0.3(50) or 15 pounds. Since it was initially assumed that the telescopic member was retracted 1.0 inch, it is readily understood that the effective rate indirectly transferred to the telescopic member is only 15 pounds per inch. The 1,500-pound rate of the spring 44 is effectively reduced 100 times.

Continuing the assumption of the above example, when fluid pressure in the high-pressure chamber reaches 1,400 pounds per square inch and reacts against the 0.3-square inch surface area, a load-leveling force of 420 pounds, 0.3(1,400), is exerted through the telescopic member 18. The load-leveling force of 420 pounds is achieved without adding undesirable lengths to the suspension unit 10 as the length of spring 44 does not add to or influence total length. Consequently, the suspension unit 10 is able to fit within length and diameter restrictions normally found in vehicular suspensions.

Heretofore, operation of the suspension unit 10 has been explained in accordance with its load-leveling capabilities. Should the load be removed from the automotive suspension, pressure in the high-pressure chamber causes telescopic member 18 to extend which compresses spring 66. This, in turn, results in a constantly exerted force against floating piston 68. Fluid is slowly displaced through the orifice 70 as the floating piston 68 travels in an upwardly fashion. The floating piston activates pressure relief valve 78 after an elapsed time period, which allows fluid to return to the fluid reservoir 12 through passageway 58. After pressure has been relieved in the high-pressure chamber, telescopic member 18 retracts. Spring 76 biases floating piston 68 to rapidly return to its initial position as fluid is displaced past the lip seals 72, 74 which coact as one-way check valves. The relief valve 78 may also be activated by high fluid pressure that would affect the structural integrity of the suspension unit.

A suspension unit having the capabilities of load-leveling and damping at a low spring rate has been explained. If desired, the damping capability may be excluded by eliminating a plurality of valves to provide open passageways. For example, the following valves may be eliminated to provide free fluid flow: (1) rebound check valve 50, (2) jounce replenishing valve 52, (3) rebound replenishing valve 56, and (4) check valve 54. After the valves are excluded, the suspension unit will act as a load-leveling device as previously explained.

Figure 2:
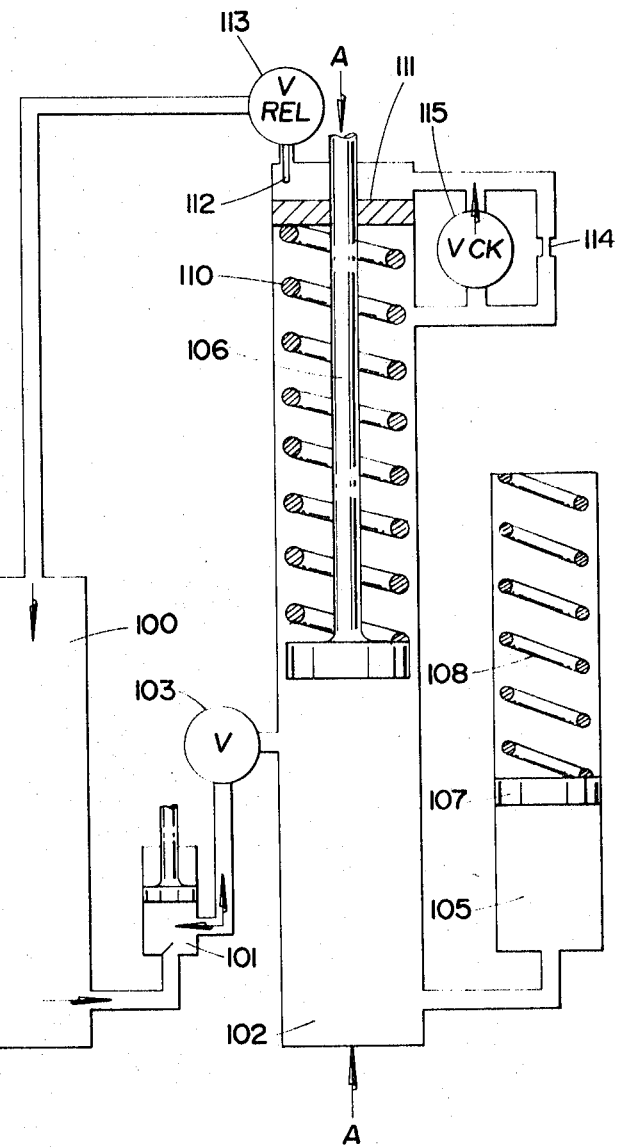
FIG. 2 is a schematic of a fluid circuit of the invention.

Referring to FIG. 2, the hydraulic circuitry comprises fluid working chambers interconnected with fluid passageways and fluid control means. A hydraulic working fluid is drawn from the fluid reservoir 100 during the intake stroke of the pump 101 and distributed to the high-pressure chamber 102 during the discharge stroke of the pump 101. The pump converts reciprocatory mechanical energy into hydraulic potential energy by raising the fluid pressure in the high-pressure chamber 102. A valve 103 operates as the pump exit check valve during the pump-up mode of the high-pressure chamber 102. When the fluid in the high-pressure chamber has attained an operable pressure during the leveling mode of the suspension unit, valve 103 opens to permit bidirectional fluid flow between the pump 101 and high-pressure chamber 102 which deactivates the pump 101. A telescopic member 106 having a cross-sectional surface area is extensible from and reciprocably movable within the high-pressure chamber 102. A compressive force A—A applied to the member 106 and high-pressure chamber 102 is hydraulically balanced by high-pressure fluid reacting on the cross-sectional surface area of the member 106.

As telescopic member 106 retracts into the high-pressure chamber 102, fluid is transferred in an amount equal to the volume displaced by the member 106. Fluid is transferred to the pressure-regulating chamber 105 where it hydraulically reacts against the surface area of piston 107. This causes the high rate spring 108 to compress and exert a force on the piston 107. Pressure in the high-pressure chamber 102 increases and reacts against the cross-sectional surface area of the telescopic member 106 and imparts a reduced spring rate thereto. For example, a spring rate of 15 pounds per inch will be imparted to the telescopic member 106 if the cross-sectional area of the member 106 is 0.3 inch, the surface area of the piston 107 is 3.0 inches and the rate of the spring 108 is 1,500 pounds per inch.

Should the compressive load A—A be reduced or removed, telescopic member 106 is hydraulically forced toward the upper region of the high-pressure chamber 102. Such movement compresses spring 110 against the relief valve activator 111 and biases it toward the mechanical release 112 of the relief valve 113. Fluid is slowly displaced through orifice 114 which results in slow movement of the relief valve actuator 111. When contact is made, the relief valve 113 will be mechanically unseated to allow fluid to return to the reservoir 100. Check valve 115 permits the relief valve actuator to rapidly return to a neutral position by opening to allow a rapid displacement of fluid when the telescopic member 106 is retracted into the high-pressure chamber 102. Relief valve 113 may also be actuated by high fluid pressure which would jeopardize the integrity of the high-pressure chamber 102.

The foregoing detailed description was made for purpose of illustration only and is not intended to limit the scope of the invention which is to be determined from the appended claims.

What is claimed is:

1. A load-leveling hydraulic suspension unit of the type having:
    a fluid reservoir,
    a high-pressure chamber;
    a telescopic member extensible from and retractable into the high-pressure chamber;
    a hydraulic retracting surface area defined of the telescopic member;
    means for pumping a fluid from the fluid reservoir to the high-pressure chamber and increasing fluid pressure in the high-pressure chamber to hydraulically react the fluid against the surface area and extend the telescopic member to a redetermined position; and means for returning fluid from the high-pressure chamber to the fluid reservoir when the telescopic member extends beyond a predetermined position;

wherein the improvement comprises:

a fluid pressure-regulating chamber fluidically communicable with the high-pressure chamber;

piston means disposed within said fluid chamber for varying the volume thereof, said piston means defining a hydraulic reacting surface area which is greater than the hydraulic reacting surface area defined of the telescopic member; and spring means for biasing said piston means toward reducing the volume of said pressure-regulating chamber;

whereby the ratio of the two hydraulic reacting surface areas is determinative of the spring rate transferable from said spring means to the telescopic member.

2. An improved hydraulic control circuit for a load-leveling hydraulic suspension unit, the circuit fillable with a fluid and of the type having:

a fluid reservoir a fluid receiving high-pressure chamber;

a telescopic member extensible from and retractable into the high-pressure chamber;

a hydraulic reacting surface area defined of the telescopic member;

means for pumping fluid from the fluid reservoir to the high-pressure chamber and increasing fluid pressure in the high-pressure chamber to hydraulically react the fluid against the surface area and extend the telescopic member to a predetermined position; and means for returning fluid from the high-pressure chamber to the fluid reservoir when the telescopic member extends beyond a predetermined position;

wherein the improvement comprises:

a fluid pressure-regulating chamber hydraulically communicable with the high-pressure chamber;

piston means disposed within the pressure-regulating chamber for varying the volume thereof, said piston means defining a hydraulic reacting surface area greater than the hydraulic reacting surface area of the telescopic member; and spring means for biasing said piston means toward reducing the volume of said pressure-regulating chamber;

whereby the ratio of the two hydraulic reacting surface areas is determinative of the force hydraulically transferred from said piston means to the telescopic member.

3. In the method of simultaneously providing damping, springing and load-leveling forces to a telescopic member of a hydraulic suspension unit as activated by jounce and rebound movements which activate a hydraulic control circuit by the method of:

a. pumping a hydraulic fluid from a fluid reservoir to a high-pressure chamber with a pumping means activated by jounce and rebound movements;

b. increasing the fluid energy level in the high-pressure chamber with the pumping means;

c. damping the reciprocating movement of the telescopic member protruding from and reciprocating in the high-pressure chamber;

d. reacting a surface area of the telescopic member reciprocating in the high-pressure chamber, with high-energy fluid to extend the extremity;

e. deactivating the pumping means when the telescopic member is extended a predetermined amount;

f. decreasing the fluid energy in the high-pressure chamber by bleeding fluid from the high-pressure chamber to the fluid reservoir when the telescopic member extends beyond a predetermined position;

the improvement comprises simultaneously with step (d), the step of:

regulating the fluid energy in the high-pressure chamber during jounce and rebound movements by hydraulically reacting the high-energy fluid in the high-pressure chamber against a spring biased piston having a hydraulic surface reacting area greater than the hydraulic reacting surface area of the telescopic member.

* * * * *